(12) United States Patent
Cohn (10) Patent No.: US 7,913,343 B1
(45) Date of Patent: Mar. 29, 2011

(54) COUNTERBALANCE MECHANISM FOR FOLD OUT RAMP

(75) Inventor: Alan Cohn, Lockeford, CA (US)

(73) Assignee: Lift-U, a division of Hogan Mfg., Inc., Escalon, CA (US)

( * ) Notice: Subject to any disclaimer, the term of this patent is extended or adjusted under 35 U.S.C. 154(b) by 0 days.

(21) Appl. No.: 12/754,462

(22) Filed: Apr. 5, 2010

Related U.S. Application Data (60) Provisional application No. 61/252,524, filed on Oct. 16, 2009.

(51) Int. Cl.
*E01D 1/00* (2006.01)
(52) U.S. Cl. .......................... 14/71.3; 14/71.1
(58) Field of Classification Search .............. 74/53, 567, 74/569, 603; 14/71.1, 71.3
See application file for complete search history.

(56) References Cited

U.S. PATENT DOCUMENTS

| | | | |
|---|---|---|---|
| 2,547,532 A * | 4/1951 | Mendelsohn | 248/292.11 |
| 4,081,091 A | 3/1978 | Thorley | |
| 4,274,172 A | 6/1981 | Franklin | |
| 4,365,374 A | 12/1982 | Bennett | |
| 4,499,970 A | 2/1985 | Hussey | |
| 4,503,722 A | 3/1985 | Suzuki | |
| 4,525,887 A | 7/1985 | Erlandsson | |
| 4,550,623 A | 11/1985 | Gysling | |
| 4,571,775 A | 2/1986 | Leonard | |
| 4,621,391 A | 11/1986 | Leonard | |
| 4,627,784 A | 12/1986 | Collins | |
| 4,657,233 A | 4/1987 | Vroom | |
| 4,665,579 A | 5/1987 | Bennett | |
| 4,691,956 A | 9/1987 | Hodge | |
| 4,797,042 A | 1/1989 | McFarland | |
| 4,836,736 A | 6/1989 | Neagu | |
| 4,873,791 A | 10/1989 | Lyons, Sr. | |
| 4,907,936 A | 3/1990 | Bourdage | |
| 4,950,124 A | 8/1990 | Burghart | |
| 5,040,936 A | 8/1991 | Rhea | |
| 5,085,555 A | 2/1992 | Vartanian | |
| 5,111,912 A * | 5/1992 | Kempf | 187/250 |

(Continued)

FOREIGN PATENT DOCUMENTS

DE   4413444 A1   10/1995

(Continued)

OTHER PUBLICATIONS

"Flat Ramp (FLT)," © 2009 Fall Protection Systems, Inc., <http://www.fallprotectionsystems.com/access_systems.html> [retrieved Jul. 14, 2009], 5 pages.

(Continued)

*Primary Examiner* — Gary S Hartmann
(74) *Attorney, Agent, or Firm* — Christensen O'Connor Johnson Kindness PLLC (57) ABSTRACT

A ramp assembly includes a ramp portion configured for reciprocating motion between a stowed position, a deployed position, and a neutral position. A counterbalance comprises a shaft and a crank fixedly coupled to the shaft. A rod is rotatably coupled to the crank with an end fitting, and an end stop is slidably coupled to the rod. A compression spring is disposed between the end fitting and the end stop, wherein the compression spring provides a force to bias the ramp portion toward the stowed position when the ramp portion is between the deployed position and the neutral position, and toward the deployed position when the ramp portion is between the stowed position and the neutral position.

9 Claims, 8 Drawing Sheets

U.S. PATENT DOCUMENTS

| | | | |
|---|---|---|---|
| 5,145,310 A | 9/1992 | Calzone | |
| 5,224,722 A | 7/1993 | Kempf | |
| 5,253,410 A | 10/1993 | Mortenson | |
| 5,306,113 A | 4/1994 | Mann | |
| 5,316,432 A | 5/1994 | Smalley | |
| 5,358,301 A | 10/1994 | Konchan | |
| 5,375,962 A | 12/1994 | Kempf | |
| 5,391,041 A | 2/1995 | Stanbury | |
| 5,392,481 A | 2/1995 | Hageman | |
| 5,449,267 A | 9/1995 | Ablabutyan | |
| 5,865,593 A | 2/1999 | Cohn | |
| 5,871,329 A * | 2/1999 | Tidrick et al. | 414/537 |
| 5,988,724 A | 11/1999 | Wolda | |
| 6,010,298 A | 1/2000 | Cohn | |
| 6,112,353 A | 9/2000 | Winter | |
| 6,125,491 A | 10/2000 | Alexander | |
| 6,196,609 B1 | 3/2001 | Bowers | |
| 6,203,265 B1 | 3/2001 | Cohn | |
| 6,210,098 B1 | 4/2001 | Cohn | |
| 6,238,168 B1 | 5/2001 | Cohn | |
| 6,409,458 B1 | 6/2002 | Cohn | |
| 6,602,041 B2 | 8/2003 | Lewis | |
| 6,698,998 B2 | 3/2004 | Koretsky | |
| 6,718,886 B2 | 4/2004 | Engle | |
| 6,769,149 B2 | 8/2004 | Alexander | |
| 6,843,635 B2 | 1/2005 | Cohn | |
| 6,964,445 B1 | 11/2005 | Bellis, Jr. | |
| 6,988,289 B2 | 1/2006 | Pedersen | |
| 7,029,050 B1 | 4/2006 | Johnson | |
| 7,156,441 B2 | 1/2007 | Austin | |
| 7,228,582 B1 | 6/2007 | Jones | |
| 7,264,433 B2 | 9/2007 | Navarro | |
| 7,353,558 B2 | 4/2008 | Alexander | |
| 7,500,818 B1 | 3/2009 | Johnson | |
| 2002/0197141 A1 | 12/2002 | Cohn | |
| 2004/0096304 A1 | 5/2004 | Lewis | |
| 2004/0136820 A1 | 7/2004 | Cohn | |
| 2008/0006105 A1 | 1/2008 | Ko | |
| 2008/0271268 A1 | 11/2008 | Johnson | |
| 2008/0273956 A1 | 11/2008 | Morris | |

FOREIGN PATENT DOCUMENTS

| | | |
|---|---|---|
| DE | 297 07 803 U1 | 10/1997 |
| DE | 102004048761 A1 | 4/2006 |
| EP | 0875421 A1 | 11/1998 |
| EP | 1844980 A2 | 10/2007 |
| GB | 585917 | 2/1947 |
| GB | 2 116 940 A | 10/1983 |
| GB | 2 274 092 A | 7/1994 |
| GB | 2306152 A | 4/1997 |
| GB | 2369344 A | 5/2002 |
| JP | 07-108867 | 4/1995 |
| JP | 2001-239888 | 9/2001 |
| JP | 2008-230270 | 10/2008 |
| WO | 0147746 A1 | 7/2001 |

OTHER PUBLICATIONS

"Mechanical Dock Levelers," K&K Material Handling, n.d., <http://www.knkmaterialhandling.com/Dock/Frame_DockProducts.htm> [retrieved Jul. 16, 2009], 7 pages.

* cited by examiner

COUNTERBALANCE MECHANISM FOR FOLD OUT RAMP

BACKGROUND

The Americans with Disabilities Act (ADA) requires the removal of physical obstacles to those who are physically challenged. The stated objective of this legislation has increased public awareness and concern over the requirements of the physically challenged. Consequentially, there has been more emphasis in providing systems that assist such a person to access a motor vehicle, such as a bus or minivan.

A common manner of providing the physically challenged with access to motor vehicles is a ramp. Various ramp operating systems for motor vehicles are known in the art. Some slide out from underneath the floor of the vehicle and tilt down. Others are stowed in a vertical position and are pivoted about a hinge, while still others are supported by booms and cable assemblies. The present invention is generally directed to a "fold out" type of ramp. Such a ramp is normally stowed in a horizontal position within a recess in the vehicle floor, and is pivoted upward and outward to a downward-sloping extended position. In the extended position, the ramp is adjustable to varying curb heights.

Fold out ramps on vehicles confront a variety of technical problems. Longer ramps are desirable because the resulting slope is more gradual and more accessible by wheelchair-bound passengers. Longer ramps are, however, heavier and require more torque about the hinge to be reciprocated between deployed and stowed positions. To satisfy this torque requirement, such fold-out ramps use large electric motors, pneumatic devices, or hydraulic actuators to deploy and stow the ramp. Many of such systems cannot be moved manually in the event of failure of the power source unless the drive mechanism is first disengaged. Some existing fold-out ramps can be deployed or stowed manually, but they are difficult to operate because one must first overcome the resistance of the drive mechanism.

As noted above, many existing fold-out ramps are equipped with hydraulic, electric, or pneumatic actuating devices. Such devices are obtrusive and make access to and from a vehicle difficult when the ramp is stowed. Moreover, many of such fold-out ramps have no energy storage capabilities to aid the lifting of the ramp, and thereby preserve the life of the drive motor or even allow a smaller drive to be employed. Finally, operating systems for such fold-out ramps must have large power sources to overcome the torque placed on the hinge by the necessarily long moment arm of the fold-out ramp.

SUMMARY

A ramp assembly includes a ramp portion configured for reciprocating motion between a stowed position, a deployed position, and a neutral position. The ramp assembly further includes a counterbalance. The counterbalance comprises a shaft configured to rotate in a first direction when the ramp portion moves toward the stowed position, and in a second direction when the ramp portion moves toward the deployed position. A crank is fixedly coupled to the shaft, and a rod is rotatably coupled to the crank about an axis of rotation. The axis of rotation moves along an arcuate path when the ramp portion reciprocates between the stowed position and the deployed position. An end fitting is attached to the rod, and an end stop slidably coupled to the rod. A compression spring is disposed between the end fitting and the end stop, wherein the compression spring provides a force to bias the ramp portion (1) toward the stowed position when the ramp portion is between the deployed position and the neutral position, and (2) toward the deployed position when the ramp portion is between the stowed position and the neutral position.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Exemplary embodiments of the present invention will now be described with reference to the accompanying drawings where like numerals correspond to like elements. Exemplary embodiments of the disclosed subject matter are directed to ramp assemblies, and in particular, to wheelchair ramp assemblies. In particular, described embodiments are directed to wheelchair ramp assemblies suitable for use in buses, vans, etc.

The following discussion proceeds with reference to examples of wheelchair ramp assemblies for use in vehicles having a floor, such as a bus, van, etc. While the examples provided herein have been described with reference to their association with vehicles, it will be apparent to one skilled in the art that this is done for illustrative purposes and should not be construed as limiting the scope of the claimed subject matter. Thus, it will be apparent to one skilled in the art that aspects of the present disclosure may be employed with other ramp assemblies used in stationary installations, such as residential buildings and the like.

When a ramp assembly is installed in a vehicle, some components of the ramp assembly may maintain a fixed relationship relative to the vehicle structure, while other components move relative to the vehicle structure when the ramp reciprocates between a stowed position and a deployed position. Similarly, when a ramp assembly is installed in a stationary installation, such as a residential building and the like, some components of the ramp assembly may maintain a fixed relationship relative to the building structure, while other components move relative to the building structure when the ramp reciprocates between a stowed position and a deployed position.

The following detailed description may use illustrative terms such as vertical, horizontal, front, rear, roadside, curbside, proximal, distal, etc. However, these terms are descriptive in nature and should not be construed as limiting. Further, it will be appreciated that embodiments of the present disclosure may employ any combination of features described herein.

Figure 1:
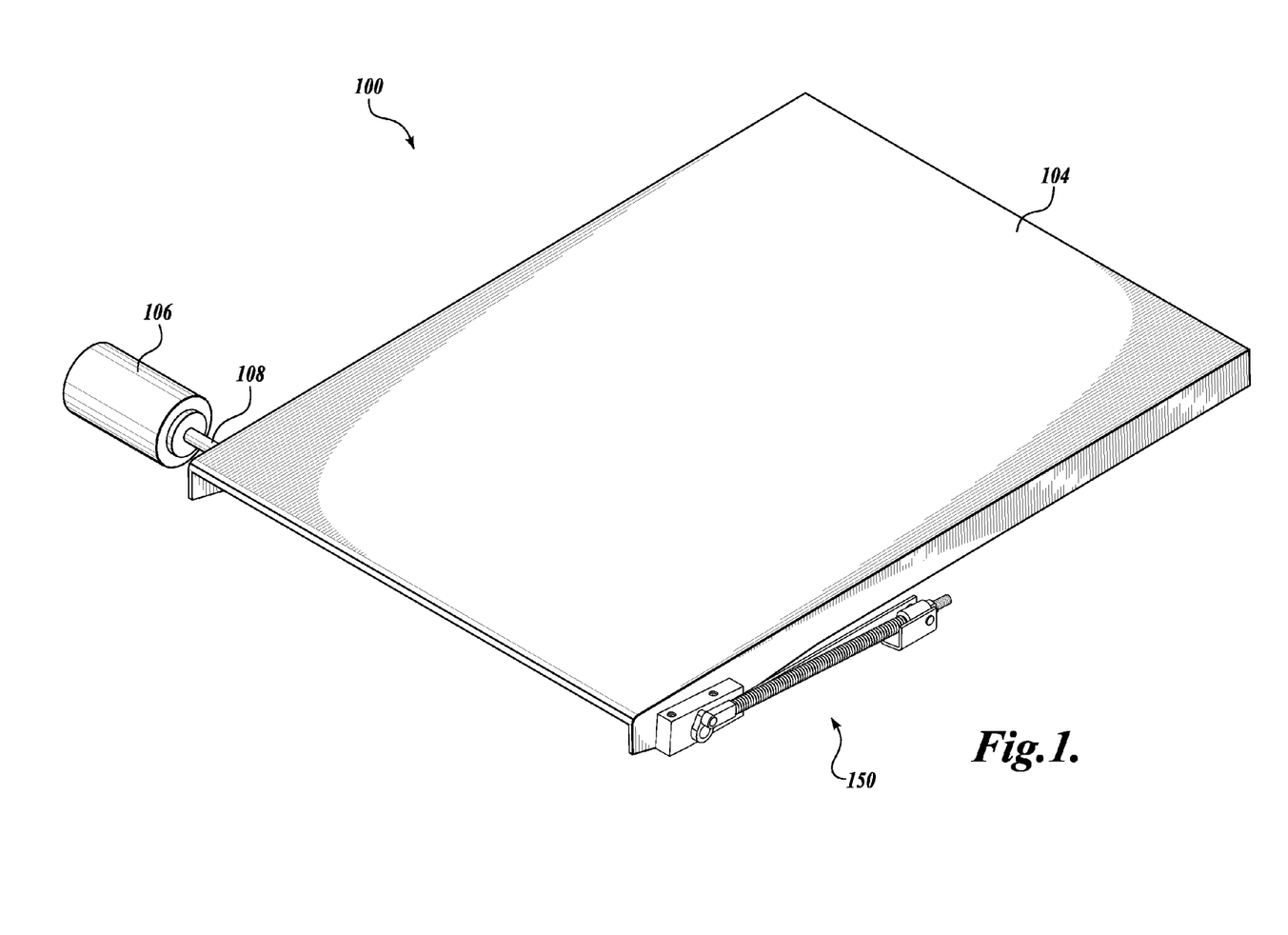
FIG. 1 shows an isometric view of a fold out ramp having a first embodiment of a counterbalance mechanism, wherein a ramp portion is shown in the stowed position.
Figure 2:
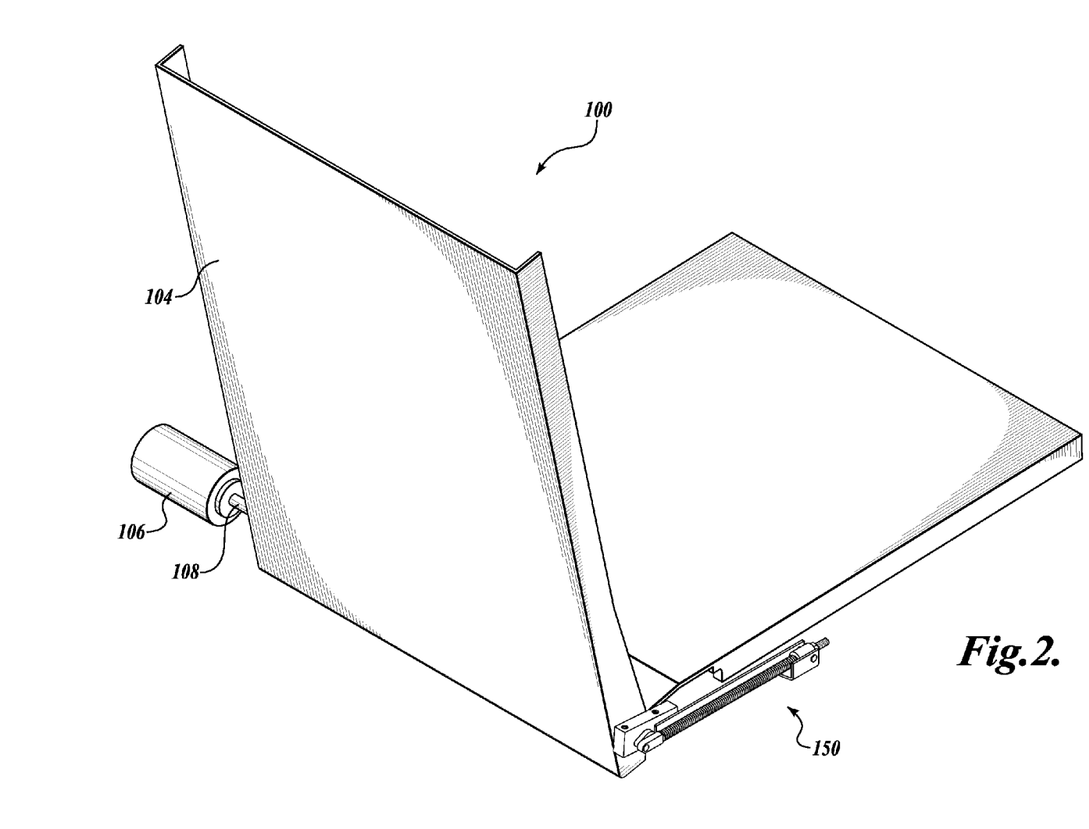
FIG. 2 shows an isometric view of the fold out ramp of FIG. 1 with the ramp portion in a position between the stowed position and a deployed position.
Figure 3:
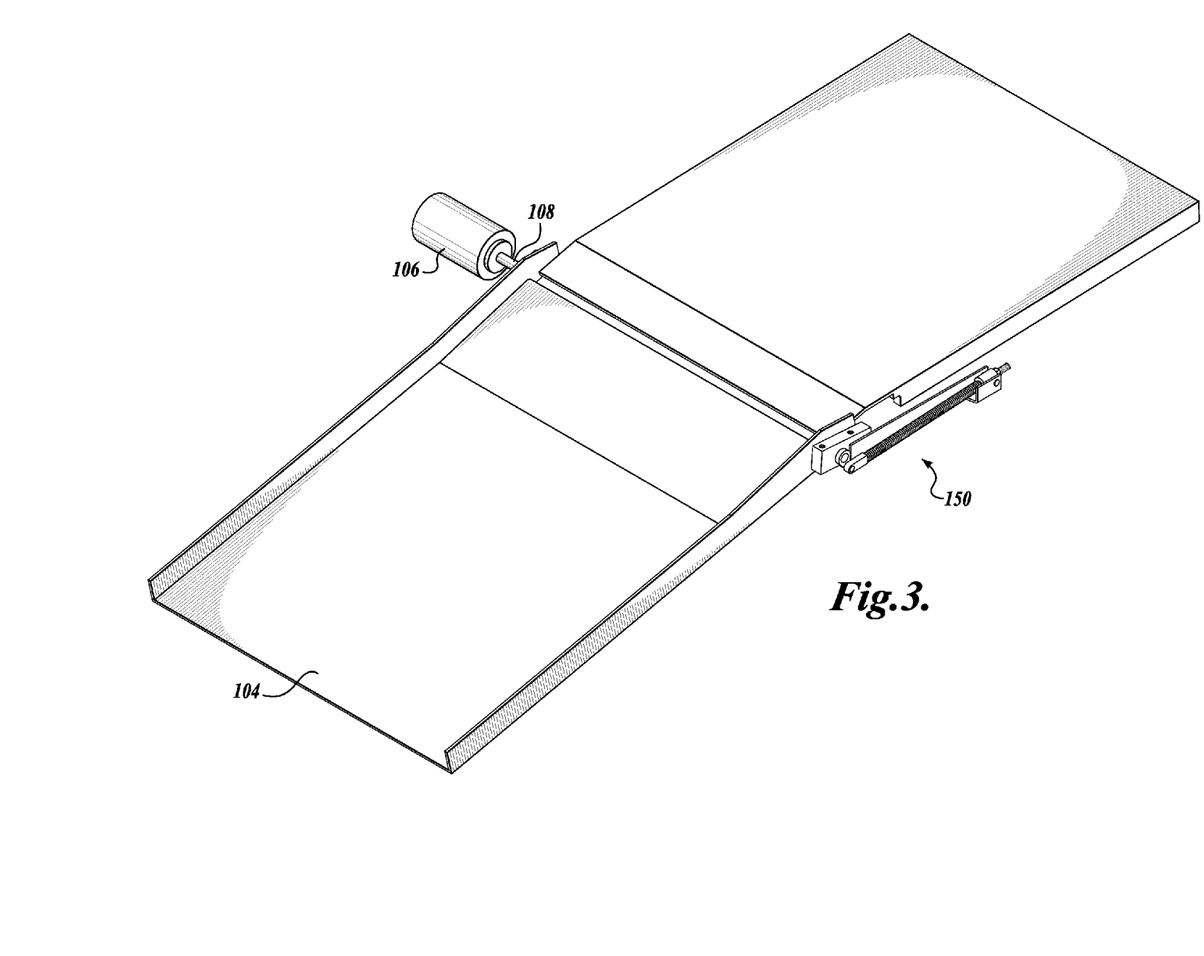
FIG. 3 shows an isometric view of the fold out ramp of FIG. 1 with the ramp portion in a deployed position.

FIGS. 1-3 illustrate an exemplary embodiment of a fold out ramp assembly 100 (hereinafter the "ramp assembly 100") suitable for use with the described counterbalance assemblies. The ramp assembly 100 includes a ramp portion 104. The ramp assembly 100 is adapted to be mounted to a vehicle (not shown), such as a bus or a van. One end of the ramp portion 104 is rotatably coupled to the ramp assembly 100 so that the ramp portion 104 is reciprocal between the stowed position, as shown in FIG. 1, and a deployed position, as shown in FIG. 3. A motor 106 is operatively coupled between the ramp assembly 100 or vehicle (not shown), and the ramp portion 104 with a drive shaft 108 to reciprocate the ramp portion 104 between the stowed position and a deployed position.

Figure 4:
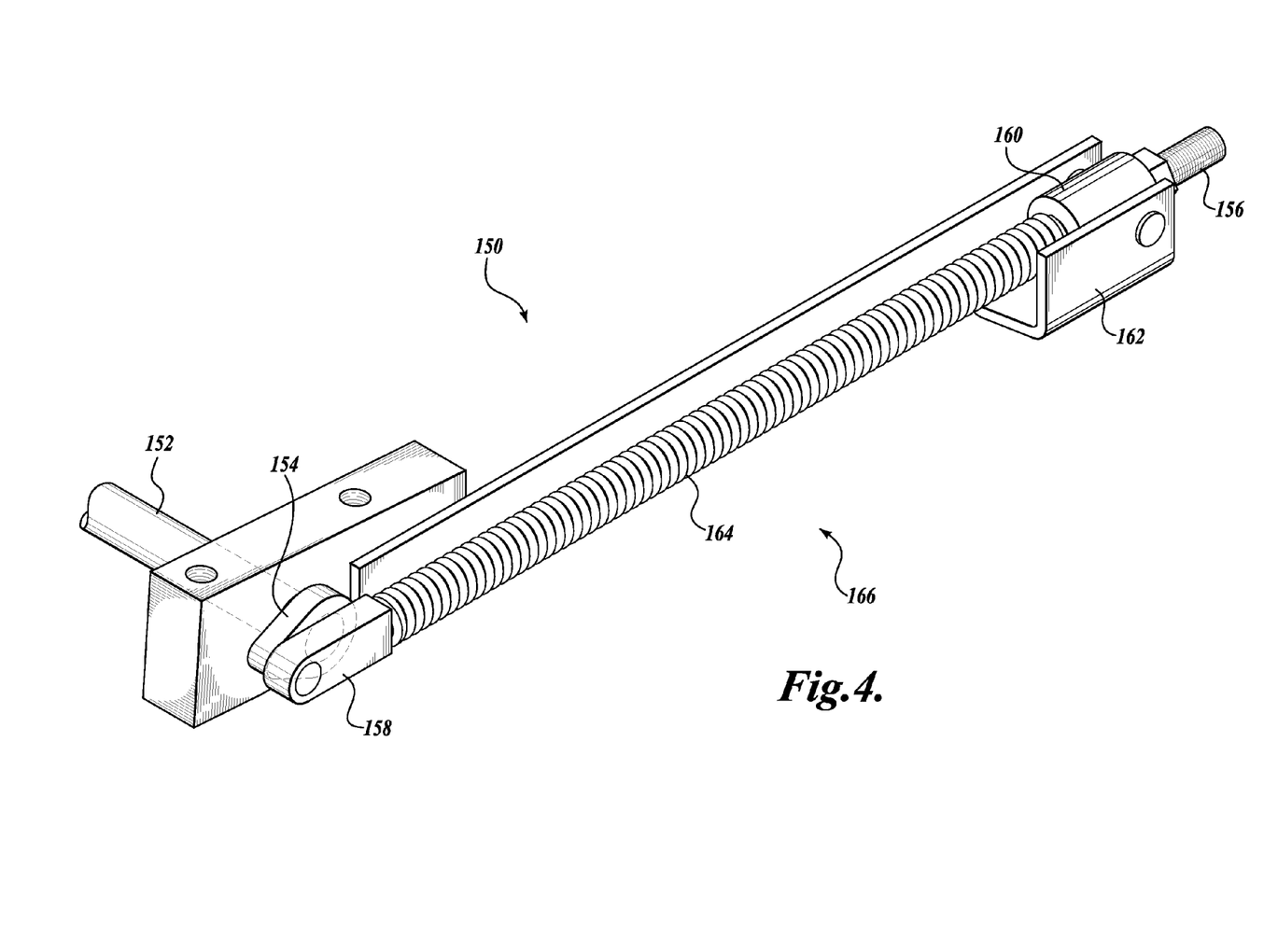
FIG. 4 shows an isometric view of the counterbalance assembly of FIG. 1 when the ramp portion is in the neutral position.

FIGS. 4-7 show a first exemplary embodiment of a counterbalance assembly 150. As best shown in FIG. 4, the counterbalance assembly 150 includes an output shaft 152 that rotates in a first direction when the ramp portion 104 moves toward the stowed position and in a second direction when the ramp portion 104 moves toward a deployed position. A crank 154 is attached to the output shaft 152 so that the crank 154 rotates with the output shaft 152. In the illustrated embodiment, the center of rotation of the ramp portion 104 is coincident to the axis of the output shaft 152; however, one of ordinary skill in the art would recognize that the location and orientation of the output shaft 152 can differ with the inclusion of various known transmission elements to couple the output shaft 152 to the ramp portion 104. In yet another embodiment, the driveshaft 108 that couples the motor 106 to the ramp portion 104 can act as an output shaft 152, i.e., the shaft to which the counterbalance 150 is attached. For ramp assemblies 100 having the motor 106 located in an internal portion of the ramp assembly, such a configuration would allow the counterbalance assembly to be located internal to the ramp assembly 100 also, i.e. under the ramp portion 104 when the ramp portion is in the stowed position. It should be appreciated that the output shaft 152 can be any shaft associated with the ramp assembly 100 that rotates in a first direction when the ramp portion 104 moves toward the stowed position and in a second direction when the ramp portion moves toward a deployed position.

Still referring to FIG. 4, the counterbalance assembly 150 further includes a resistance member 166 that applies a force to the crank 154 to counteract the weight W of the ramp portion 104. The resistance member 166 includes a rod 156, a first end of which is attached to an end fitting 158. The end fitting 158 is rotatably coupled to the crank 154 about an axis of rotation so that the axis of rotation travels along a predetermined arcuate path when the crank 154 rotates. The second end of the rod 156 slidingly engages an end stop 160. The end stop 160 is rotatably coupled to a portion 162 of the ramp assembly 100 that maintains a fixed position relative to the neutral position of the ramp portion, i.e., to a fixed portion of the ramp assembly 100. It should be appreciated that the end stop 160 may also be rotatably coupled to some other component of the vehicle that maintains a fixed position relative to neutral position of the ramp portion. A spring 164 is disposed between the end fitting 158 and the end stop 160. In the illustrated embodiment, the spring 164 is a compression spring positioned so that the rod 156 extends through a central portion of the spring 164.

Figure 5:
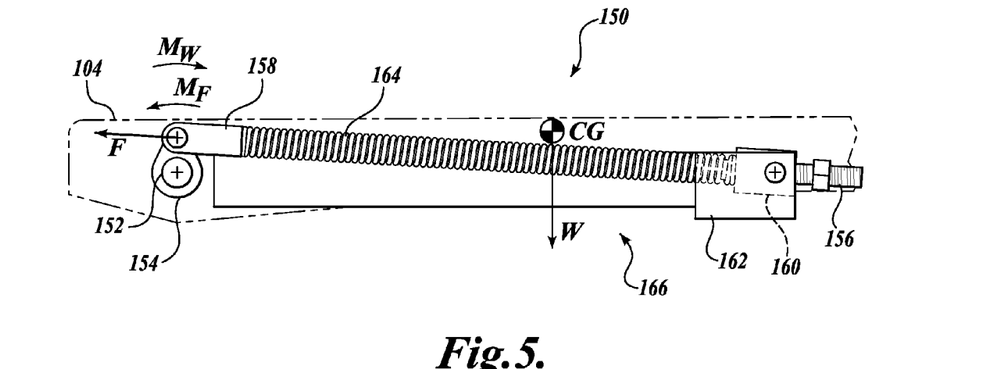
FIG. 5 shows a side view of the counterbalance assembly of FIG. 4 with the ramp portion in the stowed position.
Figure 6:
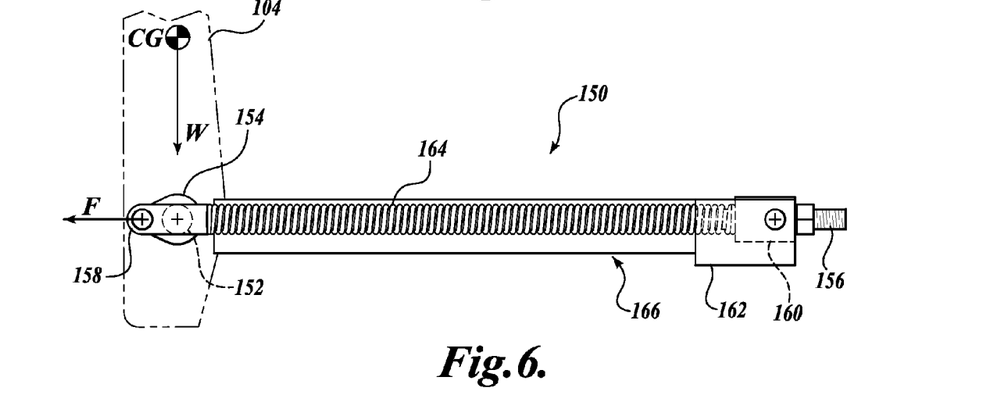
FIG. 6 shows a side view of the counterbalance assembly of FIG. 4 with the ramp portion in the neutral position.
Figure 7:
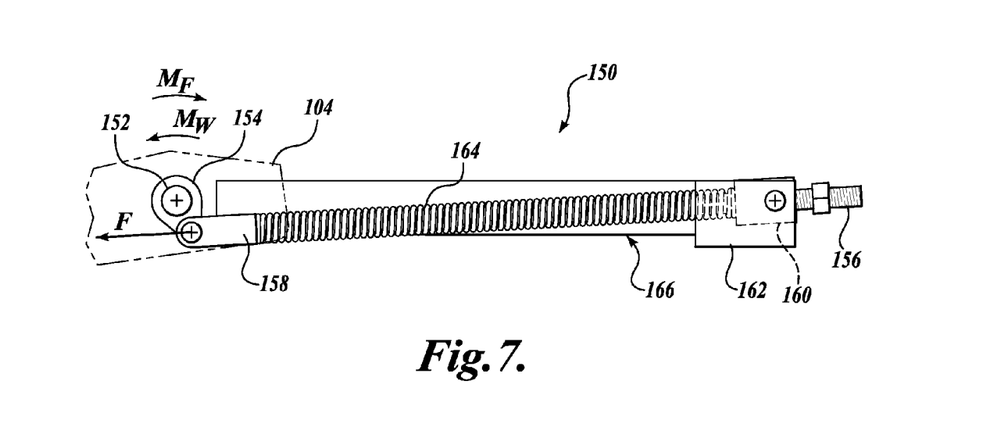
FIG. 7 shows a side view of the counterbalance assembly of FIG. 4 with the ramp portion in a deployed position.

FIGS. 5-7 show the ramp assembly 100 as the ramp portion 104 rotates from the stowed position (FIG. 5) through a neutral position (FIG. 6) to a deployed position (FIG. 7). Referring to FIG. 5, when the ramp is in the stowed position, the weight W of the ramp portion 104, which is idealized as a point force acting at the CG, imparts a moment $M_W$ about the center of rotation of the ramp portion 104. Because the CG is located roadside of the center of rotation of the ramp portion 104, the moment $M_W$ tends to rotate the ramp portion 104 toward the stowed position, i.e., away from the neutral position. The moment $M_W$ is the product of the weight W of the ramp portion 104 multiplied by moment arm, which is the horizontal distance between (1) the center of rotation of the ramp portion and (2) the CG of the ramp portion. As the ramp portion moves from the stowed position toward the neutral position, the moment arm decreases, and thus, the moment $M_W$ tending to rotate the ramp toward the stowed position is reduced.

Referring to FIG. 6, when the ramp portion 104 is in the neutral position, the CG of the ramp portion 104 is directly above the center of rotation of the ramp portion so that moment arm is zero. Accordingly, the weight W of the ramp portion 104 does not impart a moment $M_W$ on the ramp portion 104 when the ramp portion is in the neutral position.

When the ramp portion 104 is located between the neutral position and a deployed position, the CG of the ramp portion is located curbside of the center of rotation of the ramp portion 104. Consequently, the weight W of the ramp portion 104 imparts a moment $M_W$ that tends to move the ramp portion farther away from the neutral position. As the ramp portion moves from the neutral position to a deployed position, the moment arm and, therefore, the moment increase until the ramp portion is approximately horizontal. As the ramp portion 104 continues to travel from the approximately horizontal position to its final deployed position, the moment arm, and thus the moment $M_W$, decrease slightly.

As the ramp portion 104 reciprocates between the stowed position and a deployed position, the resistance member 166 applies a force F that pushes on the crank 122 to create a moment $M_F$ about the center of rotation of the ramp portion 104. The moment $M_F$ counteracts the moment $M_W$ that results from the weight W of the ramp portion 104 when the ramp portion 104 is in a position other than the neutral position.

Referring to FIGS. 5 and 7, when the ramp portion 104 is between the stowed position and the neutral position or between a deployed position and the neutral position, the moment $M_F$ imparted by the resistance member 166 tends to rotate the ramp portion 104 toward the neutral position. As the ramp portion 104 rotates toward the neutral position from either the stowed position or a deployed position, the line of action of the force F rotates toward the center of rotation of the output shaft 152, thereby reducing the distance between the line of action and the center of rotation of the crank 122, i.e., the moment arm of $M_F$. Consequently, like the moment $M_W$, the moment $M_F$ applied to the shaft 152 is reduced as the ramp portion 104 approaches the neutral position.

The moment $M_F$ imparted by the resistance member also varies due to changes in the magnitude of the force F provided by the spring 164. In this regard, when the end fitting 158 travels along the predetermined arcuate path in response to rotation of the crank 154, the end stop 160 pivots relative to the portion 162 of the ramp assembly 100. This motion changes the distance between the pivot point of the end stop 160 and the pivotal connection of the rod 156 to the crank 154. As shown in FIG. 6, the distance between the end fitting 158 and the end stop 160 is greatest when the ramp portion 104 is in the neutral position. As the ramp portion 104 moves from the neutral position toward the stowed position (FIG. 5) or a deployed position (FIG. 7), the distance between the end fitting 158 and the end stop 160 is reduced.

As the ramp portion 104 reciprocates between the stowed position and a deployed position, the spring 164 engages the end fitting 158 at one end and the end stop 160 at the opposite end. As a result, the spring 164 compresses to provide a force F that pushes on the crank 154 to create a moment $M_F$ about the output shaft 152. As the ramp portion moves away from the neutral position, the compression of the spring 164 increases. As a result, the force F applied to the crank 154 by the spring 164, and thus the moment $M_F$, increases as the ramp portion 104 moves farther away from the neutral position.

When the ramp portion 104 is in the neutral position, i.e., when the weight W of the ramp portion 104 is directly above the center of rotation of the ramp portion so that that weight W does not impart a moment $M_W$ on the ramp portion 104, any force F provide by the resistance member acts through the center of rotation of the shaft 152. Accordingly, no moment $M_F$ is imparted by the resistance member 166.

The spring 164 is preferably sized such that as the ramp portion 104 reciprocates between the stowed position and a deployed position, compression of the spring 164 imparts a force F of a magnitude such that $M_F$ approximates $M_W$ as the ramp portion reciprocates between the stowed position and a deployed position. Minimizing the difference between $M_F$ and $M_W$ in this manner reduces the output requirement on the motor 106, allowing for a smaller, more compact motor. Manual operation effort is also reduced.

In the disclosed embodiment, the spring 164 engages the end fitting 158 and the end stop 160 when the ramp portion 104 is in the neutral position. In this position, the spring 164 may be partially compressed, applying a force through the center of rotation of the shaft 152. Alternately, the spring 164 may uncompressed when the ramp portion 104 is in the neutral position so that the spring 164 applies no force F to the shaft 152 in the neutral position.

Figure 8:
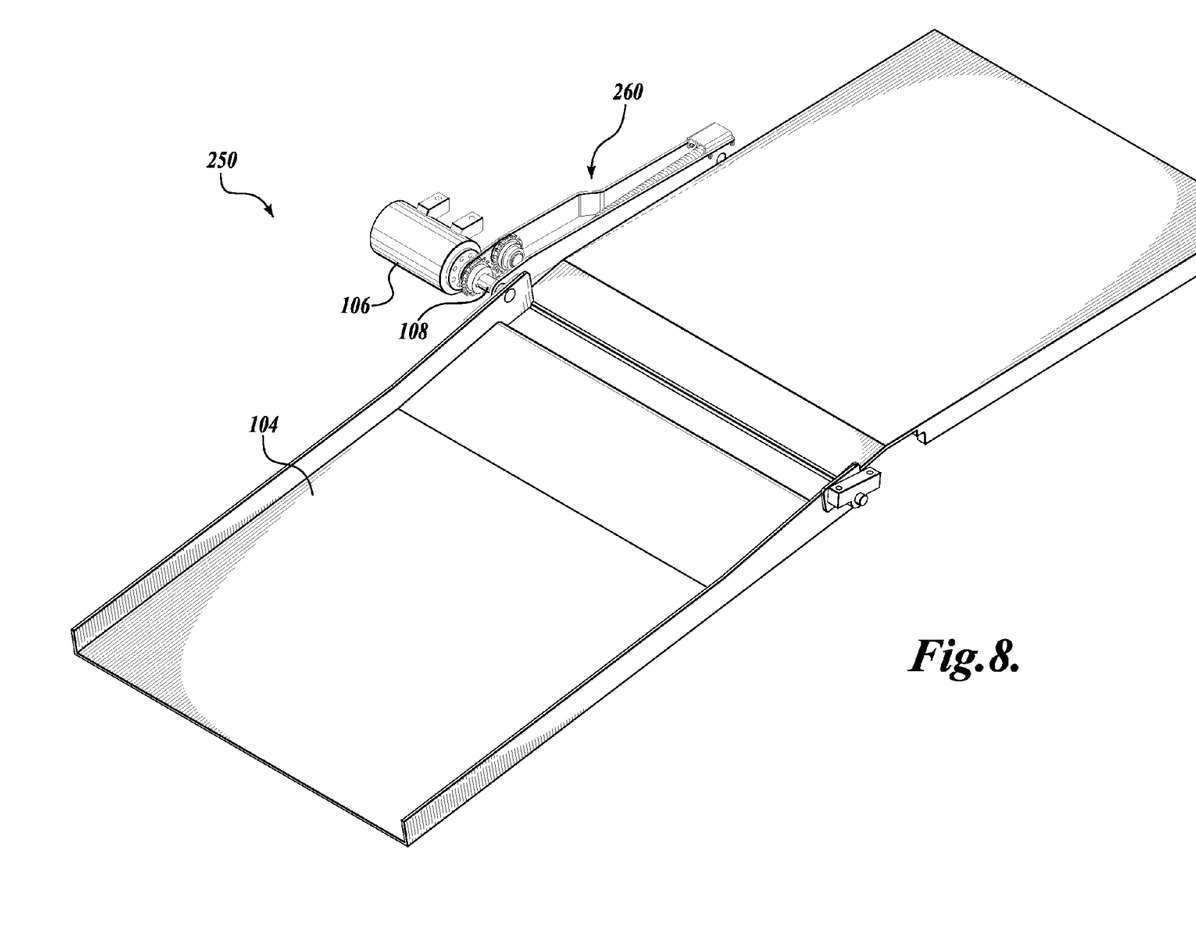
FIG. 8 shows an isometric view of the fold out ramp of FIG. 1 having a having a second embodiment of a counterbalance mechanism, wherein the ramp portion is shown in a deployed position.

FIGS. 8-12 show a second exemplary embodiment of a counterbalance assembly 250 suitable for use with a fold out ramp, such as the one shown in FIGS. 1-3. As shown in FIG. 8, the counterbalance assembly 250 is positioned between the motor 106 and the ramp portion 104 of the ramp assembly 100; however, it should be appreciated that the counterbalance assembly 250, like the previously described embodiment, can also be positioned on the side of the ramp assembly 100 opposite to the motor 106. Similarly, the previously disclosed counterbalance assembly can be positioned on the same side of the ramp assembly 100 as the motor 106.

Figure 9:
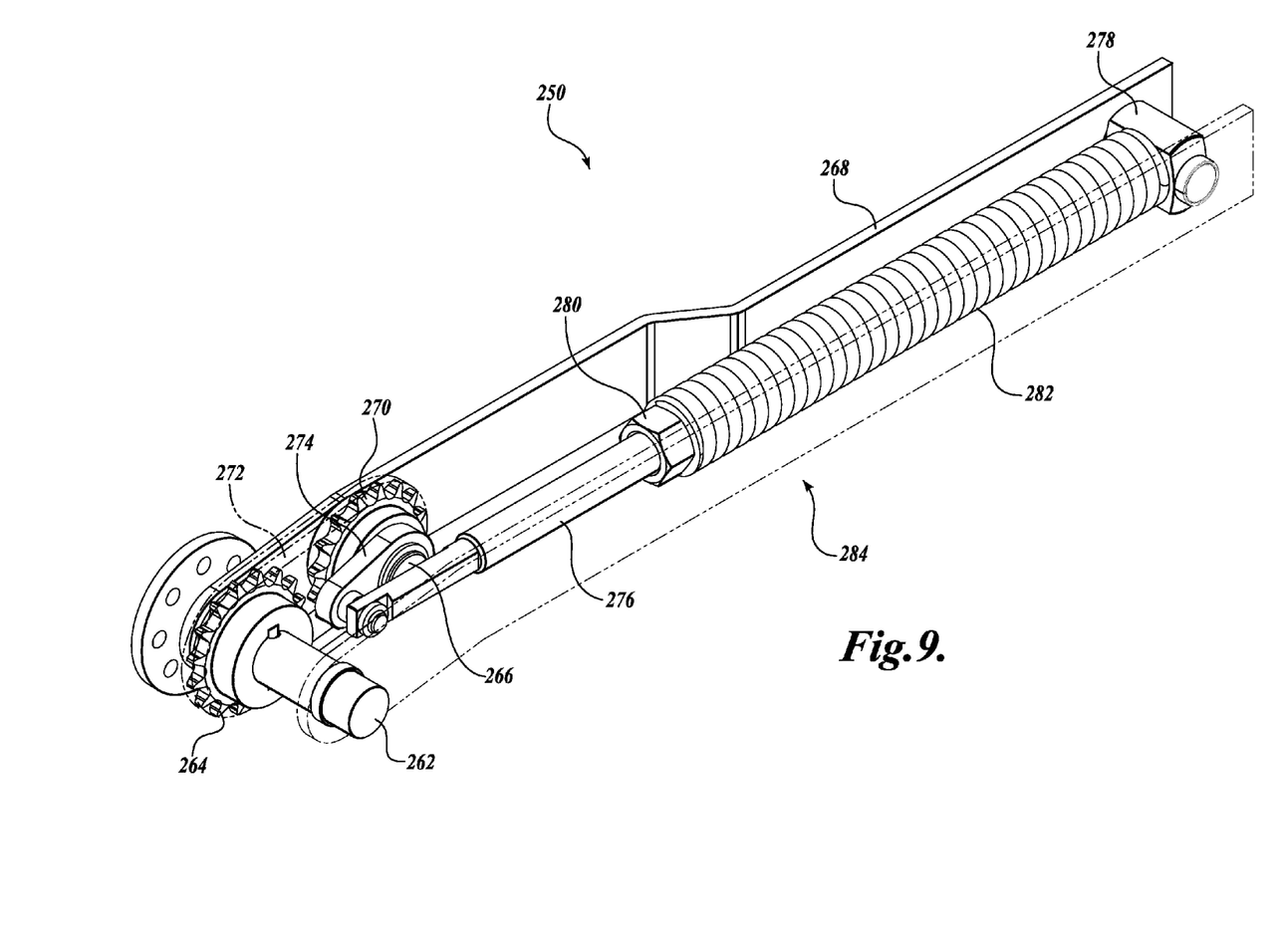
FIG. 9 shows an isometric view of the counterbalance assembly of FIG. 8 when the ramp portion is in the neutral position.
Figure 10:
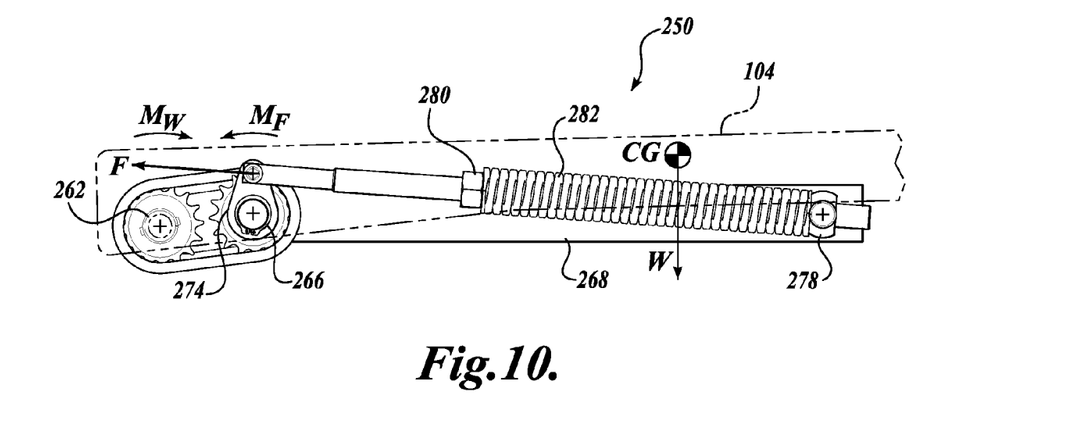
FIG. 10 shows a side view of the counterbalance assembly of FIG. 8 with the ramp portion in the stowed position.

Referring to FIG. 9, the counterbalance assembly 250 includes an output shaft 262, that rotates in a first direction when the ramp portion 104 moves toward the stowed position and in a second direction when the ramp portion 104 moves toward a deployed position. A first sprocket 264 is attached to the output shaft 262. A second shaft 266 is rotatably secured to a portion 268 of the ramp assembly 100 that maintains a fixed position relative to the neutral position of the ramp portion 104, i.e., a fixed portion of the ramp assembly. It should be appreciated that the second shaft 266 may also be rotatably secured to some other component of the vehicle that maintains a fixed position relative to the neutral position of the ramp portion 104. A second sprocket 270 is attached to the second shaft 266 and is operably coupled to the first sprocket 264 with a chain 272 so that rotation of the output shaft 262 rotates the second shaft 266. Alternate embodiments are possible wherein the sprockets and chains are replaced with belts and pulleys, gears, or other known transmission elements suitable for transferring rotational motion from a first shaft to a second shaft. Further, it should be appreciated that the use of a second shaft operably linked to the output shaft is not limited to the present embodiment, but may be used in conjunction with the previously described embodiments. In an alternate embodiment, the second shaft 266 is fixedly coupled to a portion 268 of the ramp assembly 100, and the second sprocket 270 is rotatably attached to the second shaft 266.

The counterbalance assembly 250 further includes a crank 274 attached to the second shaft 266 so that rotation of the second shaft rotates the crank 274. A resistance member 284 applies a force F to the crank 274. The resistance member 284 includes a rod 276 rotatably coupled at a first end to the crank 274 about an axis of rotation so that the axis of rotation travels along a predetermined arcuate path when the crank 274 rotates. The second end of the rod 276 slidingly engages an end stop 278. The end stop 278 is rotatably coupled to a portion 268 of the ramp assembly 100 that maintains a fixed location relative to the neutral position of the ramp portion 104. An end fitting 280 is attached to a portion of the rod 276 between the first end of the rod 276 and the end stop 278. The end stop 278 and the end fitting 280 cooperate to restrain a spring 282 disposed therebetween. The spring is positioned so that the rod extends through a central portion of the spring 282, and a first end of the spring 282 engages the end stop 278, while the second end of the spring 282 engages the end fitting 280.

Figure 11:
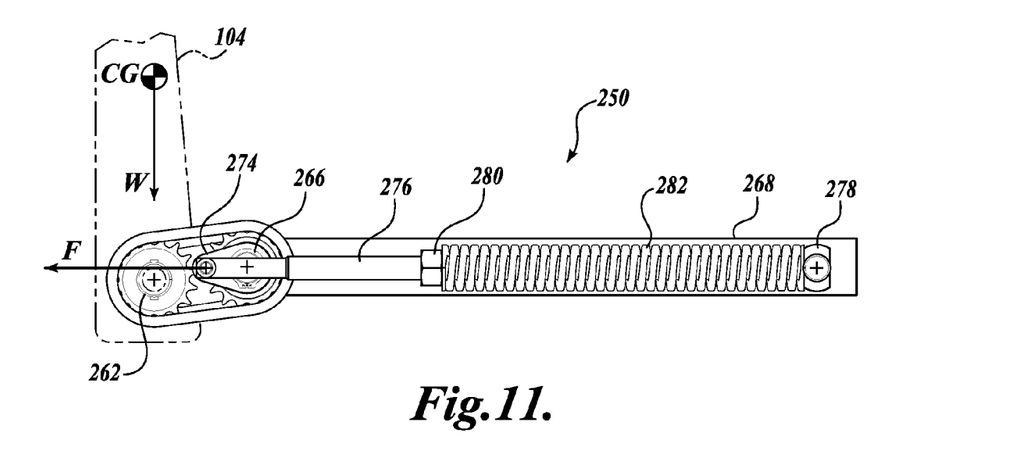
FIG. 11 shows a side view of the counterbalance assembly of FIG. 8 with the ramp portion in the neutral position.
Figure 12:
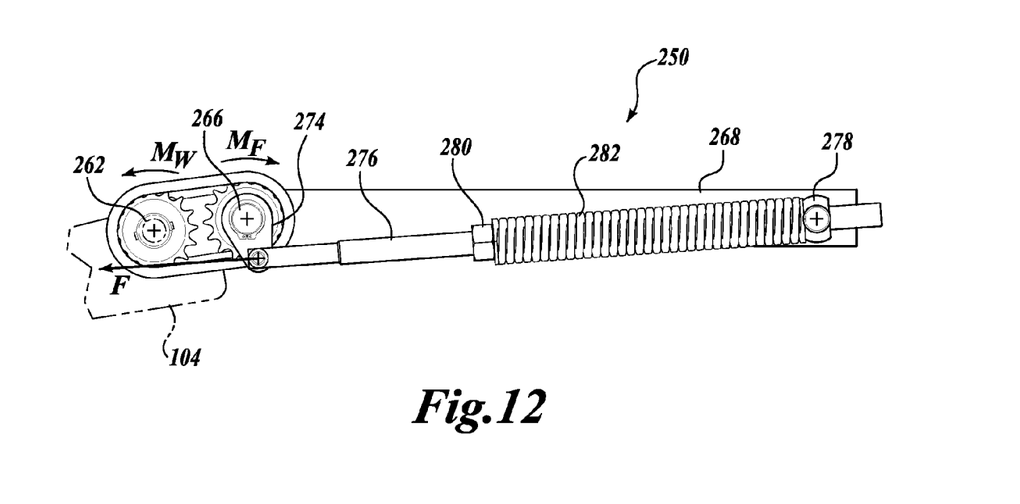
FIG. 12 shows a side view of the counterbalance assembly of FIG. 8 with the ramp portion in a deployed position.

When the first end of the rod 276 travels along the predetermined arcuate path in response to rotation of the crank 274, the end stop 278 pivots relative to the portion 268 of the ramp assembly 100. This action results in a change in the distance between the end stop 278 and the end fitting 280. As shown in FIG. 11, the distance between the end stop 278 and the end fitting 280 is greatest when the ramp portion 104 is in the neutral position. As the ramp portion 104 moves from the neutral position toward the stowed position (FIG. 10) or a deployed position (FIG. 12), this distance decreases.

As the ramp portion 104 moves from the neutral position toward the stowed position or a deployed position, the spring 282 is compressed between the end stop 278 and the end fitting 280. As a result, the spring 282 applies a force F that pushes on the crank 274 to create a moment $M_F$ about the center of rotation of the second shaft 266. The moment $M_F$ is transferred via the chain 272 to the output shaft 262, and thus, the ramp portion 104. The moment $M_F$ acts on the output shaft 262 to counteract the moment $M_W$ that results from the weight W of the ramp portion 104 when the ramp portion 104 is in a position other than the neutral position, i.e., the moment $M_F$ tends to rotate the ramp portion 104 toward the neutral position.

As the ramp portion 104 moves away from the neutral position, the compression of the spring 282 increases. As a result, the force F applied to the crank 274 by the spring 282, and thus the moment $M_F$, increases as the ramp portion 104 moves away from the neutral position. In addition, as the ramp portion 104 moves away from the neutral position, the line of action of the force F rotates away from the axis of rotation of the second shaft 266. This rotation increases the moment arm, and therefore increases the moment $M_F$ imparted by the force F.

The spring 282 is preferably sized such that as the ramp portion 104 reciprocates between the stowed position and a deployed position, compression of the spring 282 imparts a force F of a magnitude such that $M_F$ approximates $M_W$, thereby minimizing the difference between $M_F$ and $M_W$. Minimizing the difference between $M_F$ and $M_W$ in this manner reduces the output requirement on the motor 106, allowing for a smaller, more compact motor. Manual operation effort is also reduced.

In the disclosed embodiment, the spring 282 engages the end stop 278 and the end fitting 280 when the ramp portion 104 is in the neutral position. In this position, the spring 282 may be partially compressed, applying a force through the center of rotation of the second shaft 266. This force is selectively adjustable by repositioning the end fitting 280, which is illustrated as a nut threadedly coupled to a threaded portion of the rod 276. By repositioning the nut, the distance between the end fitting 280 and the end stop 278 is controlled so that a desired preload, or no preload, on the spring 282 is achieved.

While illustrative embodiments have been illustrated and described, it will be appreciated that various changes can be made therein without departing from the spirit and scope of the invention.

The embodiments of the invention in which an exclusive property or privilege is claimed are defined as follows:

1. A ramp assembly, comprising:
   (a) a ramp portion configured for reciprocating motion between a stowed position, a deployed position, and a neutral position; and
   (b) a counterbalance associated with the ramp portion, comprising:
      (i) a first shaft configured to rotate (1) in a first direction when the ramp portion moves toward the stowed position, and (2) in a second direction opposite the first direction when the ramp portion moves toward the deployed position;
      (ii) a crank fixedly coupled to the shaft;
      (iii) a rod rotatably coupled to the crank about a first axis of rotation, the first axis of rotation moving along an arcuate path when the ramp portion reciprocates between the stowed position and the deployed position;
      (iv) an end fitting coupled to the rod;
      (v) an end stop slidably coupled to the rod; and
      (vi) a compression spring disposed between the end fitting and the end stop, wherein the compression spring provides a force to bias the ramp portion (1) toward the stowed position when the ramp portion is between the deployed position and the neutral position, and (2) toward the deployed position when the ramp portion is between the stowed position and the neutral position.

2. The ramp assembly of claim 1, wherein the end stop is coupled for rotational movement about a second axis of rotation, wherein the second axis of rotation has a fixed position relative to the neutral position of the ramp portion.

3. The ramp assembly of claim 1, wherein movement of the ramp portion from the neutral position toward the stowed position moves the end fitting toward the end stop to compress the compression spring, and movement of the ramp portion from the neutral position toward the deployed position moves the end fitting toward the end stop to compress the compression spring.

4. The ramp assembly of claim 1, wherein the rod extends through a central portion of the compression spring.

5. The ramp assembly of claim 1, wherein the end fitting is selectively positionable to adjust an amount of precompression in the compression spring when the ramp portion is in the neutral position.

6. The ramp assembly of claim 5, wherein the end fitting is threadedly coupled to the rod.

7. The ramp assembly of claim 1, further comprising:
   (a) a second shaft configured to rotate (1) in a first direction when the ramp portion moves toward the stowed position, and (2) in a second direction opposite the first direction when the ramp portion moves toward the deployed position; and
   (b) a transmission element coupling the first shaft to the second shaft so that rotation of the second shaft rotates the first shaft.

8. The ramp assembly of claim 7, wherein the transmission element comprises one of the group consisting of: a chain, a belt, and a gear.

9. The ramp assembly of claim 1, wherein the force provided by the compression spring does not bias the ramp portion when the ramp portion is in the neutral position.

* * * * *